United States Patent [19]

Conte

[11] Patent Number: 4,794,796

[45] Date of Patent: Jan. 3, 1989

[54] BALANCING-VESSEL TRANSDUCER WITH INTER-COMMUNICATING CHAMBERS FOR THE CONVERSION OF A PNEUMATIC SIGNAL, LOW STRENGTH NOTWITHSTANDING, INTO A QUANTIFIABLE OUTPUT OF WHATEVER NATURE

[76] Inventor: Randolph N. Mitchell, Via Vincenzo Renieri, 14 -00142 Roma, Italy

[21] Appl. No.: 17,773

[22] Filed: Feb. 20, 1987

[30] Foreign Application Priority Data

Mar. 7, 1986 [IT] Italy ............................... 47741 A/86

[51] Int. Cl.[4] ............................................. G01L 7/24

[52] U.S. Cl. ............................................. 73/751

[58] Field of Search ............................................. 73/751

[56] References Cited

U.S. PATENT DOCUMENTS

| | | | |
|---|---|---|---|
| 1,160,679 | 11/1915 | Wilkinson | 73/751 |
| 1,700,204 | 1/1929 | Lomer | 73/751 |
| 2,119,838 | 6/1938 | West | 73/751 |
| 2,331,153 | 10/1943 | Ackley | 73/751 |
| 2,786,481 | 3/1957 | Donaldson | 73/751 |
| 2,822,689 | 2/1958 | Bonapace | 73/752 |

FOREIGN PATENT DOCUMENTS

| | | |
|---|---|---|
| 606746 | 11/1934 | Fed. Rep. of Germany . |
| 738169 | 7/1943 | Fed. Rep. of Germany . |

*Primary Examiner*—Donald O. Woodiel

*Attorney, Agent, or Firm*—Laff, Whitesel, Conte & Saret

[57] ABSTRACT

The balancing-vessel transducer disclosed consists of a structure or housing enclosing two intercommunicating chambers part-filled with a liquid, and made freely rotatable about a horizontal axis coinciding substantially with its center of mass. One such chamber is in receipt of a pneumatic signal, while the remaining chamber is held at a constant reference pressure, such that liquid is displaced from one chamber to the other, thereby occasioning a redistribution of mass; the structure responds by rotating, its movement being checked by a force of reaction that varies in proportion to the force of the pneumatic signal, and turns through an angular distance that can be sensed in the shift of an eccentric pin attached to the structure itself.

7 Claims, 2 Drawing Sheets

BALANCING-VESSEL TRANSDUCER WITH INTER-COMMUNICATING CHAMBERS FOR THE CONVERSION OF A PNEUMATIC SIGNAL, LOW STRENGTH NOTWITHSTANDING, INTO A QUANTIFIABLE OUTPUT OF WHATEVER NATURE

BACKGROUND OF THE INVENTION

The invention relates to a balancing-vessel type of transducer with intercommunicating chambers, suitable for converting pneumatic signals, however low the strength, into a quantifiable output of whatever nature.

The prior art embraces devices by means of which to meter the shape of metal strip; devices of the type produce a pneumatic signal reflecting the degree of departure from what would be the faultless profile, or the flatness, of such strip.

A pneumatic signal produced in this way needs to be converted ultimately into a mechanical output by way of which to actuate appropriate means for correction of the error detected, and it is at this point that one encounters the major difficulty which hampers successful embodiment of the devices in question, namely: that of designing a transducer that can ensure satisfactory conversion of the pneumatic signal into a mechanical output.

There is a variety of types of transducer currently obtainable through commercial channels, covering both limited and wide pressure-sensing ranges.

Pressure-sensing ranges in the field of application specified above are particularly small, and the prior art transducers most suitable are electric. It has been found, however, that such transducers do not meet constructional requirements where response must be ultrafast, and more important still, direct and proportional.

Response provided by a prior art transducer of the electric type is overlong by reason of the number of conversions needed—viz, the pneumatic signal must be converted into an electrical signal before it can being converted into mechanical output, a process giving rise to a build-up of inertia that lengthens the response. What is more, mechanical output power (in the particular application under consideration, at all events) must be of a certain order, and such a requirement increases inertia in the transducer still further.

The prior art also embraces diaphragm type transducers for use in the field of application in question; the drawbacks with this design are well known, however, inasmuch as the diaphragm material ages and hardens, resulting in fall-off of response, sealing capacity and sensitivity of the transducer as a whole, particularly in those applications with which the disclosure is concerned.

Also of importance is the response curve produced by the transducer, which in the case of prior art types is not genuinely proportional, a fact attributable likewise to the various conversions and the transfer operations that the signal must undergo.

Accordingly, the object of the invention is that of providing a transducer which will be free from the drawbacks mentioned above and capable of an accurate conversion of pneumatic signals, including significantly low strength signals.

SUMMARY OF THE INVENTION

The object stated above is realized with a transducer as characterized in the appended claims, which features a balancing-vessel type of embodiment and consists in a structure incorporating two intercommunicating chambers that are part-filled with a liquid; such a structure is freely rotatable about a horizontal axis coinciding substantially with its center of mass, and is provided externally with a mechanical take-off that is offset to a degree from the horizontal axis and shifts in response to ingress of a pneumatic signal, into the one chamber, and of a fluid supplied at a constant reference pressure, into the remaining chamber.

Movement thus produced at the mechanical take-off is counteracted by the force of a reaction that may be offered by an external service to which it is connected, or perhaps applied externally to the structure itself.

One advantage afforded by a transducer according to the invention is that its response time is almost zero; the instant that the pneumatic signal gains the inside of the relative chamber, the liquid is displaced, bringing about a swift redistribution of mass, whereupon a balancing movement to compensate such redistribution occasions rotation of the two chambers, hence of the mechanical take-off.

Another advantage of the transducer as disclosed is that it ensures a genuine proportional relationship between pneumatic signal and mechanical reaction, tied as it is to the dimensional characteristics of the components utilized, which are stable, and not to intrinsic properties that can vary with the strength of the pneumatic signal.

A singular advantage of the transducer is its great flexibility. By varying the size of the chambers, and the distance of the mechanical take-off from their axis of rotation, the transducer can be made sensitive both to markedly weak, as well as to strong pressure signals. Similarly, application of a transducer as envisaged herein can be modified by replacing the liquid with one of a different, and precise specific weight, or by varying the reference pressure.

An important feature of the transducer according to the invention is that it ensures stable, unvarying response, proportional to unchanging parameters -viz, the size of the chambers, the degree of offset of the mechanical take-off, and the volume of liquid occupying the chambers; it is the permanent nature of such parameters that in turn ensures stability of the transducer.

Equally advantageous is the fact that the transducer affords the possibility of converting a particularly weak pneumatic signal into a notably powerful mechanical control facility. The mechanical output produced originates from components of mass, within the transducer, which balance themselves following redistribution occasioned by the pneumatic signal. Thus, by appropriate embodiment of the dimensions of a transducer as disclosed, one is able to obtain a mechanical output f sufficient power to impinge on, say, the stem of a flow control valve, flow in the system being proportional to mechanical pressure on the valve stem.

An additional advantage of the transducer is that it requires no manual operation whatever, as associated control media, such as shut-off valves, flow control valves and similar components, can be operated in direct fashion.

The flexibility afforded by the transducer is an important feature that merits reiteration; for example, a mechanical take-off attached to the twochamber structure might be replaced with any given means, electric for example, by which to measure the angular distance through which the structure shifts on receipt of the pneumatic signal, turning against a couple or other mechanical reaction that varies in proportion to the signal itself.

Thus, a balancing-vessel transducer as disclosed can function as a measuring instrument pure and simple, or in general terms, serve for the conversion of a given pneumatic signal into a quantifiable output of whatever nature.

Yet another advantage of the transducer is that it can be locked in a given position reflecting an optimum conversion value simply by incorporation of a friction brake, or similar, operating either on the structure, or on the axis of rotation only.

BRIEF DESCRIPTION OF THE DRAWINGS

A preferred embodiment of the invention will now be described in detail, by way of example, with the aid of the accompanying drawings, in which.

DESCRIPTION OF THE PREFERRED EMBODIMENT

Figure 2:
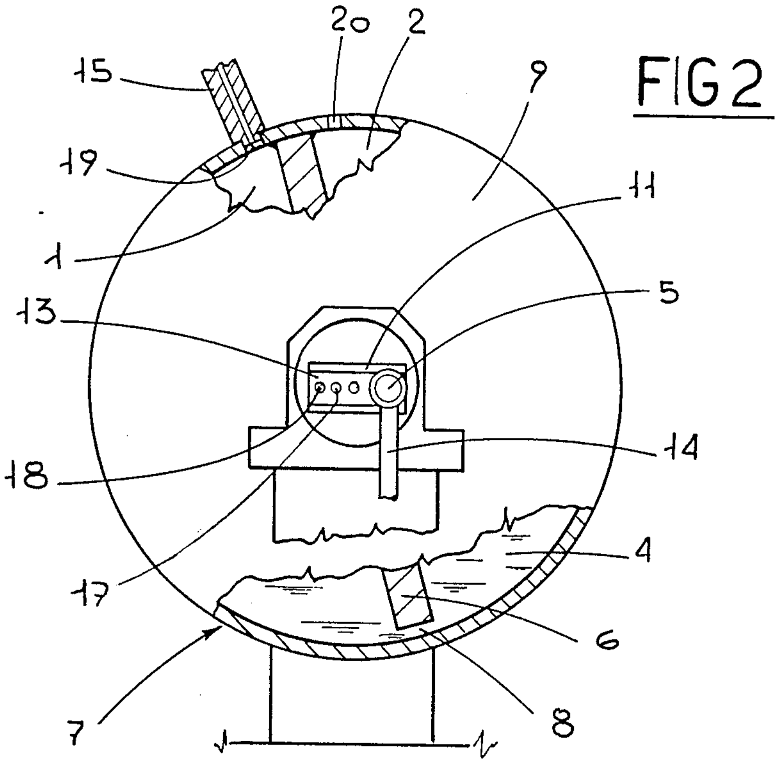
FIG. 2 is an elevation of the transducer illustrated in FIG. 1, viewed from the standpoint marked II, in which certain parts are cut away better to reveal others.

Referring first to FIG. 2, the balancing-vessel transducer disclosed takes the form of a structure 7 having two chambers 1 and 2 which intercommunicate at bottom and are part-filled with a liquid 4; such a structure is freely rotatable about a horizontal axis 3 that coincides, to all practical intents and purposes, with its center of mass.

5 denotes sensing means located externally of the structure 7 and attached thereto at a position offset in relation to its axis 3 of rotation; such means 5 serve to pick up the angular displacement that occurs in the structure 7 when rotated about its axis on receipt of a pneumatic signal, and are embodied in the drawings as a mechanical take-off connected to an unspecified service 14.

The chamber denoted 1 communicates with a line 15 carrying the pneumatic signal, whilst the chamber denoted 2 communicates with an external source of fluid supplied at a constant reference pressure.

In practice, the reference chamber 2 might simply communicate direct with the atmosphere, though for given applications it could be conditioned by an independent source of fluid pressurized to a level that is maintained constant.

The structure 7 is embodied as a cylindrical housing and provided with a substantially diametric internal baffle 6 which will be disposed either vertically or on the rake when the structure itself is perfectly balanced.

Figure 1:
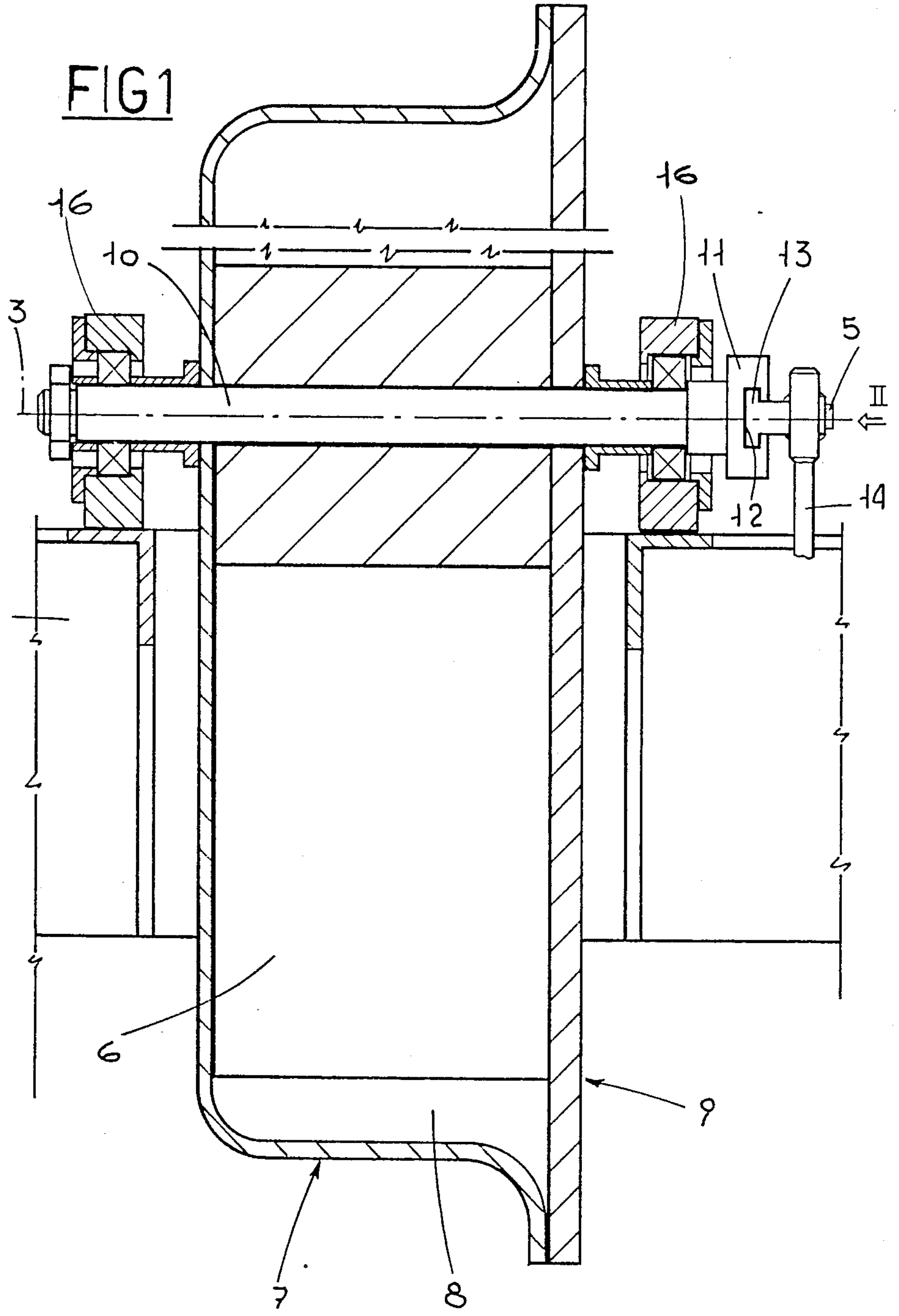
FIG. 1 is the longitudinal, axial section through a balancing-vessel transducer with intercommunicating chambers according to the invention.

The housing 7 is carried by a shaft 10 which passes through it coaxially and is journalled at either end to a mounting 16 (FIG. 1). One end of the shaft 10 is provided with a substantially parallelepiped butt 11 positioned externally of the relative mounting 16 and disposed transversely to the shaft itself.

The butt 11 exhibits a longitudinal slot 12 at the side opposite that joining with the shaft, which accommodates a slide 13 embodied with a 'T' profile such as will permit movement along the slot 12 in a lengthwise direction only, and made integral with a pin 5 disposed parallel with the shaft 10. It will be observed in FIG. 2 that the slide 13 exhibits a set of transversely disposed through holes 17 that match threaded holes (not illustrated) tapped in the parallelepiped butt 11; these matched holes in the slide and the butt accommodate fasteners 18, and permit of altering the position of the pin 5 in relation to the axis 3 about which the housing 7 is free to rotate. The pin 5 will therefore be seen to be the embodiment of the aforementioned mechanical take-off, and is offset with respect to the axis 3 about which the housing 7 rotates. The service 14 to which the pin 5 is connected is shown in FIGS. 1 & 2, by way of example, as the stem or rod of a valve (not illustrated).

19 and 20 denote ports in the top of the housing 7, one at either side of the baffle 6, by way of which one chamber 1 communicates with the line 15 carrying the pneumatic signal, and the other chamber 2 with a source of fluid supplied at a constant reference pressure, respectively; the source of fluid supplied at constant pressure might well be the atmosphere, as illustrated in FIG. 2.

The baffle 6 is embodied in such a way as to accommodate the shaft 10, and affords an opening 8 at bottom which permits intercommunication of the chambers 1 and 2. FIGS. 1 and 2 show the opening 8 as a gap existing between the housing 7 and the baffle 6, though the option exists of embodying such an opening simply as one or more holes located in the baffle 6 itself.

The housing 7 is enclosed in fluid-tight fashion by a cover 9, which in a preferred embodiment will be transparent in order to allow a visual check on the level of the liquid 4 occupying the chambers 1 and 2. The liquid 4 used would be one with good stability, essentially non-expanding, and non-aggressive to the material from which the housing 7 and cover 9 are fashioned. A number of types of oil are suitable, the selection of which is determined principally by the field of application for which the balancing-vessel transducer is envisaged.

Operation of the transducer is markedly simple. Ingress of a pneumatic signal by way of the relative line 15 occasions displacement of the liquid 4 from one chamber to the other, causing a redistribution of mass, in consequence of which the housing 7 will rotate about its axis 3, producing movement of the pin 5 and the rod 14.

Assuming the rod 14 to be connected direct to the stem of a valve, such movement of the pin 5 will occasion a proportional opening or closing movement of the valve, which terminates once balance has been restored. More exactly, balance is restored once the action of the rod 14, impinging on the valve under the pressure generated by the pneumatic signal, is matched by the reaction from the valve; in short, the pneumatic signal encounters opposition from the valve, or whatever service 14 is employed, in the form of a varying reaction that will be sustained until balance has been restored to the system.

Movement of the pin 5 will be accentuated to a greater or lesser degree according to the distance it is offset from the chambers' axis 3 of rotation.

A transducer according to the invention can be used to advantage for multiple transduction of distinct pneumatic signals, utilizing a number of transducers allocated one to each signal.

The possible fields of application for the invention are numerous. The transducer is especially effective in monitoring infinitesimal pressure differences; modifying the physical dimensions and using various types of liquid 4 however, the same basic design can be employed to equally good effect in sensing much wider shifts in pressure.

Figure 3:
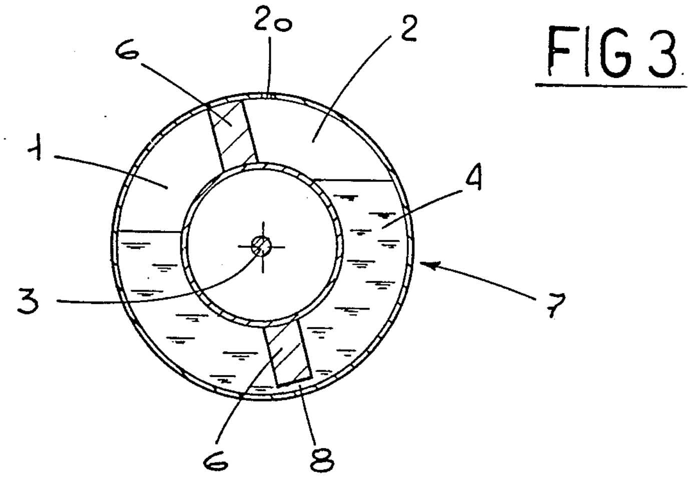
FIG. 3 is the cross section through a variant of the transducer shown in FIG. 1.

A variation on the preferred embodiment illustrated in FIG. 3 features chambers 1 and 2 which exhibit a semi-toroidal section, rather than semi-cylindrical; whilst operation of the transducer remains exactly the same as described above, this design enables a reduction in the amount of liquid utilized.

What is claimed:

1. A balancing-vessel transducer with intercommunicating chambers for the conversion of a pneumatic signal, low strength notwithstanding, comprising a cylindrical housing provided internally with a substantially diametric baffle disposed either vertically or on the rake, said housing being freely rotatable about a horizontal axis that coincides substantially with its center of mass, said baffle defining two chambers that intercommunicate by one or more openings at bottom and are part-filled with a liquid, one chamber connect connecting uppermost with an external source of fluid supplied at constant pressure, and the other chamber connect connecting with a line carrying the pneumatic signal to be converted;

a coaxially disposed shaft attached to the housing which rotates when the housing is rotated about its axis in response to ingress of the pneumatic signal into said other chamber; one end of said shafts having a butt exhibiting a longitudinal slot for the accommodation of a slide fixedly attached to a pin, and wherein the pin is the embodiment of a mechanical take-off, and the slide is adjustable for position along the length of the slot in the butt end of the shaft.

2. Transducer as in claim 1 wherein the mechanical take-off is offset from the horizontal axis about which it rotates and wherein the pin is integral with the slide.

3. Transducer as in claim 1, wherein the chamber that connects with the source of fluid supplied at constant pressure, communicates with the surrounding atmosphere.

4. Transducer as in claim 1, wherein the housing is enclosed by a transparent cover through which a visual check may be kept on the level of the liquid occupying the chambers.

5. Transducer as in claim 1, wherein the opening or openings take the form of one or more holes passing through the baffle.

6. Transducer as in claim 1, wherein the opening takes the form of a gap separating the baffle from the housing to which it is fitted.

7. Transducer as in claim 1, wherein the housing is divided internally into two concentric enclosures the outermost of which is divided in its turn, by the baffle, in such a way as to create the two chambers.

* * * * *

UNITED STATES PATENT AND TRADEMARK OFFICE

CERTIFICATE OF CORRECTION

PATENT NO. : 4,794,796

DATED : January 3, 1989

INVENTOR(S) : Randolph N. Mitchell

It is certified that error appears in the above-identified patent and that said Letters Patent is hereby corrected as shown below:

On the title page under Item (19), "Conte" should read --Mitchell--.

Signed and Sealed this

Thirteenth Day of March, 1990

*Attest:*

JEFFREY M. SAMUELS

*Attesting Officer*

*Acting Commissioner of Patents and Trademarks*

UNITED STATES PATENT AND TRADEMARK OFFICE
CERTIFICATE OF CORRECTION

PATENT NO. : 4,794,796

DATED : January 3, 1989

INVENTOR(S) : Randolph N. Mitchell

It is certified that error appears in the above-identified patent and that said Letters Patent is hereby corrected as shown below:

On the title page under Item [19], "Conte" should read --Mitchell--.

Signed and Sealed this

Tenth Day of April, 1990

*Attest:*

HARRY F. MANBECK, JR.

*Attesting Officer*

*Commissioner of Patents and Trademarks*